United States Patent
Eleftheriou et al.

(10) Patent No.: US 7,596,176 B2
(45) Date of Patent: Sep. 29, 2009

(54) APPARATUS, SYSTEM, AND METHOD FOR ADAPTIVE ASYNCHRONOUS EQUALIZATION USING LEAKAGE

(75) Inventors: Evangelos S. Eleftheriou, Zurich (CH); Robert Allen Hutchins, Tucson, AZ (US); Jens Jelitto, Rueschlikon (CH); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/263,189

(22) Filed: Oct. 31, 2005

(65) Prior Publication Data

US 2007/0098061 A1    May 3, 2007

(51) Int. Cl.
H03H 7/30    (2006.01)
(52) U.S. Cl. ..................................... 375/232
(58) Field of Classification Search ................ 375/229, 375/230, 231, 232, 233, 234, 235, 236; 333/18, 333/28 R; 708/300, 322, 323; 379/340, 379/398
See application file for complete search history.

(56) References Cited

U.S. PATENT DOCUMENTS

| | | | | |
|---|---|---|---|---|
| 4,243,959 A | | 1/1981 | Duttweiler | 333/166 |
| 4,550,415 A | * | 10/1985 | Debus et al. | 375/234 |
| 5,543,978 A | | 8/1996 | Park | 360/65 |
| 5,710,799 A | * | 1/1998 | Kobayashi | 375/349 |
| 5,751,768 A | * | 5/1998 | Guglielmi et al. | 375/234 |
| 5,844,950 A | * | 12/1998 | Aono et al. | 375/346 |
| 5,937,007 A | | 8/1999 | Raghunath | 375/232 |
| 6,163,572 A | | 12/2000 | Velez et al. | 375/229 |
| 6,314,441 B1 | | 11/2001 | Raghunath | 708/322 |
| 6,865,588 B2 | | 3/2005 | Ling et al. | 708/322 |
| 2004/0014448 A1 | | 1/2004 | Talbot | 455/278 |

FOREIGN PATENT DOCUMENTS

JP    1188117 A    7/1989
WO    WO 97/27695    7/1997

OTHER PUBLICATIONS

Gitlin R.D et al., "The Tap-Leakage Algorithm: An Algorithm for the Stable Operation of a Digitally Implemented Fractionally Spaced Adaptive Equalizer", Bell System Techinal Journal, America Telephone and Telegraph Co. New York, US, vol. 6, No. 8, Date: Oct. 1, 1982, pp. 1817-1839.

Ungerboeck G., "Fractional Tap-Spacing Equalizer and Consequences for Clock Recovery in Data Modems", IEEE Transactions on Communications, IEEE Service Center, Piscataway, NJ, US, vol. Com-24, No. 8, Date: Aug. 1976, pp. 856-864.

* cited by examiner

*Primary Examiner*—Sam K Ahn
(74) *Attorney, Agent, or Firm*—Kunzler & McKenzie

(57) ABSTRACT

An apparatus, system, and method are disclosed for adaptive asynchronous equalization using leakage. An equalizer sums products of a plurality of tap signals from a delay line sampling a read signal and a plurality of corresponding tap coefficients to form an equalized signal in an asynchronous time domain having a first sampling rate. A leaky function module calculates a leaky function for each tap coefficient in the asynchronous time domain. An adaptation module adapts each of the tap coefficients as the leaky function for each tap coefficient summed with a signal-dependent updating function for each tap coefficient.

30 Claims, 13 Drawing Sheets

APPARATUS, SYSTEM, AND METHOD FOR ADAPTIVE ASYNCHRONOUS EQUALIZATION USING LEAKAGE

BACKGROUND OF THE INVENTION

1. Field of the Invention

This invention relates to adaptive equalization and more particularly relates to adapting equalization coefficients using leakage.

2. Description of the Related Art

Data processing systems often use magnetic tape for high volume, low cost data storage. For example, a data processing system may backup the data from a data storage subsystem comprising a plurality of hard disk drives to magnetic tape. Large volumes of infrequently used data may also be stored to magnetic tape. For example, data intensive geological study data, meteorological data, or the like may be cost effectively archived on magnetic tape.

A user or software application may retrieve data from the magnetic tape by mounting the magnetic tape on a magnetic tape drive and reading the data from the magnetic tape. The magnetic tape drive reads the magnetic tape by sensing magnetic polarization changes on the magnetic tape that encode the data and generates an analog signal from the magnetic polarization changes that embodies the data. The analog read signal is sampled and car converted to a plurality of digital values that form a digital read signal.

The digital read signal comprises a plurality of frequency components, each with a magnitude and phase characteristic. Variations in the magnitude and phase characteristics of the frequency components increase the difficulty of recognizing the data in the digital read signal.

As a result, the magnetic tape drive typically equalizes or adjusts the magnitude and phase characteristic of each frequency component so that the data may be more easily recognized and recovered. The magnetic tape drive often equalizes the digital read signal by storing a plurality of digital values in a delay line. The digital values are sampled for a plurality of instances of the read signal with an analog-to-digital converter operating at a sampling frequency that is not synchronized with respect to the duration of the bits stored on the tape medium. Each stored digital value or tap signal is multiplied by a coefficient and the sum of the tap coefficient products forms an equalized signal value for a specified instance of the asynchronous sampling clock.

The data may have originally been written by one or more of a variety of magnetic tape drives from a variety of manufacturers. In addition, each magnetic tape may have originally been written under a wide range of environmental conditions. As a result, when magnetic tapes are read, magnetic tape read signals often exhibit a wide range of characteristics. As a result, the magnetic tape drive must often dynamically adjust the tap coefficients used to equalize the read back signal to compensate for differences in the read signal.

Unfortunately, adapting the coefficients of the asynchronous equalizer may cause the equalization function to become unstable. For example, adapting the coefficients may drive one or more coefficients to an excessive value that destabilizes the equalization function. Therefore, some coefficient values may be frozen at specified values. Freezing coefficients reduces the probability that the equalization function will become unstable, but also reduces the equalization function's ability to adapt to differing read signal characteristics.

In addition, adapting equalization coefficients of an asynchronous equalizer often increases the strength of higher frequencies that do not include significant signal elements. As a result, the high-frequency noise of the read signal is increased, reducing the tape drives ability to recognize and retrieve data from the read signal.

From the foregoing discussion, it should be apparent that a need exists for an apparatus, system, and method that adapt equalization coefficients while maintaining equalization function stability for an asynchronous equalizer. Beneficially, such an apparatus, system, and method would increase the asynchronous equalization function's ability to adapt to different read signals.

SUMMARY OF THE INVENTION

The present invention has been developed in response to the present state of the art, and in particular, in response to the problems and needs in the art that have not yet been fully solved by currently available tap coefficient adaptation methods. Accordingly, the present invention has been developed to provide an apparatus, system, and method for adapting tap coefficients that overcome many or all of the above-discussed shortcomings in the art.

The apparatus to adapt tap coefficients is provided with a plurality of modules configured to functionally execute the necessary steps of summing products of tap signals and tap coefficients to form an equalized signal, calculating a leaky function for each tap coefficient, and adapting each tap coefficient as a leaky function summed with a signal-dependent updating function. These modules in the described embodiments include an equalizer, a leaky function module, and an adaptation module. In addition, the apparatus includes a signal-dependent updating function module and a delay line.

The analog-to-digital converter ("ADC") samples a read signal at a first instance and stores the first instance sample in a first register of a delay line. The read signal is sampled in an asynchronous time domain having a first sampling rate. In one embodiment, the first sampling rate over samples a read signal to form the digital read signal. Subsequently the ADC samples the read signal at a second instance and stores the second instance sample in the first register while copying the first instance sample to a second register. The ADC repeatedly samples the read signal, storing a plurality of samples in a plurality of registers. Each sample is available as a plurality of tap signals. The equalizer sums products of the plurality of tap signals and a plurality of corresponding tap coefficients to form an equalized signal in the asynchronous time domain.

The leaky function module calculates a leaky function for each tap coefficient in the asynchronous time domain. In one embodiment, the leaky function is the tap coefficient minus a function of the tap coefficient multiplied by a small constant.

In one embodiment, the signal-dependent updating function module calculates an error signal for each tap signal in a synchronous time domain having a second sampling rate. Each error signal may be calculated as the difference between the equalized signal interpolated into the synchronous time domain and an estimated signal. In a certain embodiment, the estimated signal is calculated from the equalized signal interpolated into the synchronous time domain and has a target signal type. In one embodiment, the target signal type is partial response class-4 ("PR4") signal. In a certain embodiment, the signal-dependent updating function is a minus constant multiplied by the error signal and the tap signal for each tap signal.

The adaptation module adapts each of the tap coefficients as the leaky function for each tap coefficient summed in the asynchronous time domain with the signal-dependent updating function for each tap coefficient interpolated into the asynchronous time domain. The apparatus adapts the tap coefficients, allowing the equalizer to adapt to changes in read signal characteristics.

A system of the present invention is also presented to adapt tap coefficients. The system may be embodied in a data storage device such as a magnetic tape drive. In particular, the system, in one embodiment, includes a communication module, a control module, a write channel module, a write head, and a read channel module comprising an equalizer, a leaky function module, and an adaptation module.

The control module controls the operation of the system. The communication module communicates with a host such as a storage device controller. The host stores data to the system and retrieves data from the system. The host may communicate data to the system through the communication module. The control module may direct the write channel module to record the data as an analog signal through the write head to the storage media.

The host may further communicate a request to retrieve data from the system through the communication module. The control module may direct the read channel module to process a read signal received from a specified portion of the storage media through the read head. The equalizer sums products of a plurality of tap signals from a delay line storing the digitized read signals and a plurality of corresponding tap coefficients to form an equalized signal in an asynchronous time domain having a first sampling rate. The leaky function module calculates a leaky function for each tap coefficient in the asynchronous time domain. The adaptation module adapts each of the tap coefficients as the leaky function for each tap coefficient summed with a signal-dependent updating function for each tap coefficient calculated in a synchronous time domain having a second sampling rate and interpolated into the asynchronous time domain. The system adapts the tap coefficients to support changes in read signal characteristics while stabilizing coefficient drift.

A method of the present invention is also presented for adapting tap coefficients. The method in the disclosed embodiments substantially includes the steps necessary to carry out the functions presented above with respect to the operation of the described apparatus and system. In one embodiment, the method includes summing products of tap signals and tap coefficients to form an equalized signal, calculating a leaky function for each tap coefficient, and adapting each tap coefficient as a leaky function summed with a signal-dependent updating function.

An equalizer sums products of a plurality of tap signals from a delay line storing digital read signals and a plurality of corresponding tap coefficients to form an equalized signal in an asynchronous time domain having a first sampling rate. A leaky function module calculates a leaky function for each tap coefficient in the asynchronous time domain. An adaptation module adapts each of the tap coefficients as the leaky function for each tap coefficient summed with a signal-dependent updating function for each tap coefficient. The method adapts the tap coefficients to allow the equalizer to adapt to changes in read signal characteristics while stabilizing coefficient drift. In addition, the method may attenuate higher frequency signals with low signal energy to improve a signal to noise ratio of the digital read signal.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention adapts tap coefficients using a leaky function allowing an asynchronously operating equalizer to adapt to changing read signal characteristics while stabilizing tap coefficient drift. In addition, the embodiment of the present invention supports the attenuation of higher frequency signals with low signal energy. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
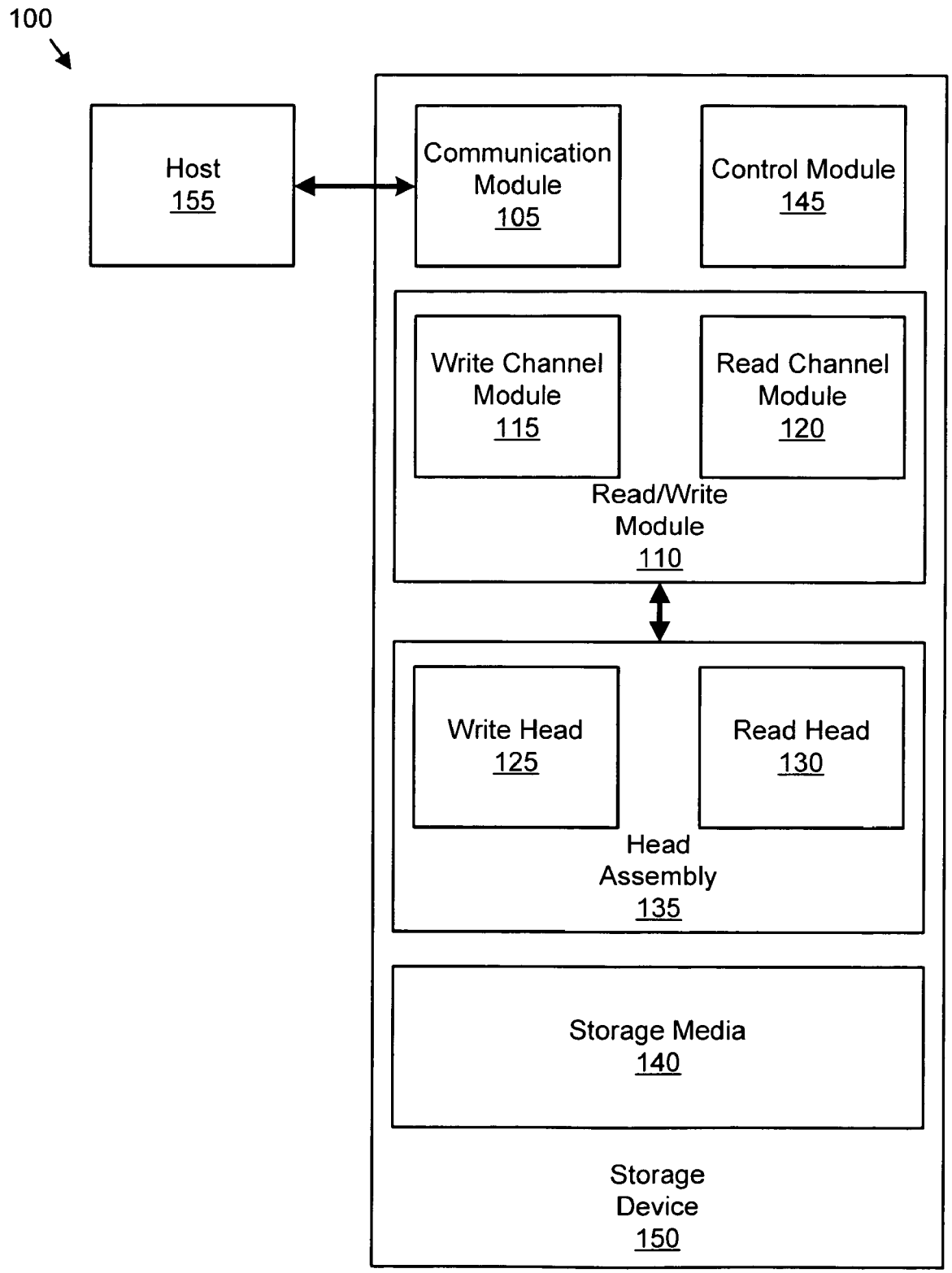
FIG. 1 is a schematic block diagram illustrating one embodiment of a data storage system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data storage system 100 of the present invention. The system 100 includes a data storage device 150 comprising a communication module 105, a control module 145, a read/write module 110 that includes a write channel module 115 and a read channel module 120, a head assembly 135 comprising a write head 125 and a read head 130, and a storage media 140. In one embodiment, the system further includes a host 155.

The control module 145 controls the operation of the data storage device 150. In one embodiment, the control module 145 includes a random access memory storing instructions executed on a processor as is well known to those skilled in the art. The communication module 105, read/write module 110, head assembly 135, and storage media 140 may operate responsive to commands from the control module 145.

The communication module 105 communicates with the host 155. The host may be a storage device controller, a mainframe computer, a network router, or the like. The communication module 105 may comprise an Ethernet interface or a Fibre Channel interface. The host 155 stores data to the data storage device 150 and retrieves data from the data storage device 150. The host 155 may communicate data to the data storage device 150 through the communication module 105. The control module 145 may direct the write channel module 115 to record the data as an analog signal through the write head 125 to the storage media 140.

The host 155 may further communicate a request to retrieve data from the data storage device 150 through the communication module 105. The control module 145 may direct the read channel module 120 to process an analog read signal or read signal received from a specified portion of the storage media 140 through the read head 130. The read channel module 120 converts the read signal into a plurality of digital samples forming a digital read signal and identifies data from the digital read signal.

Figure 2:
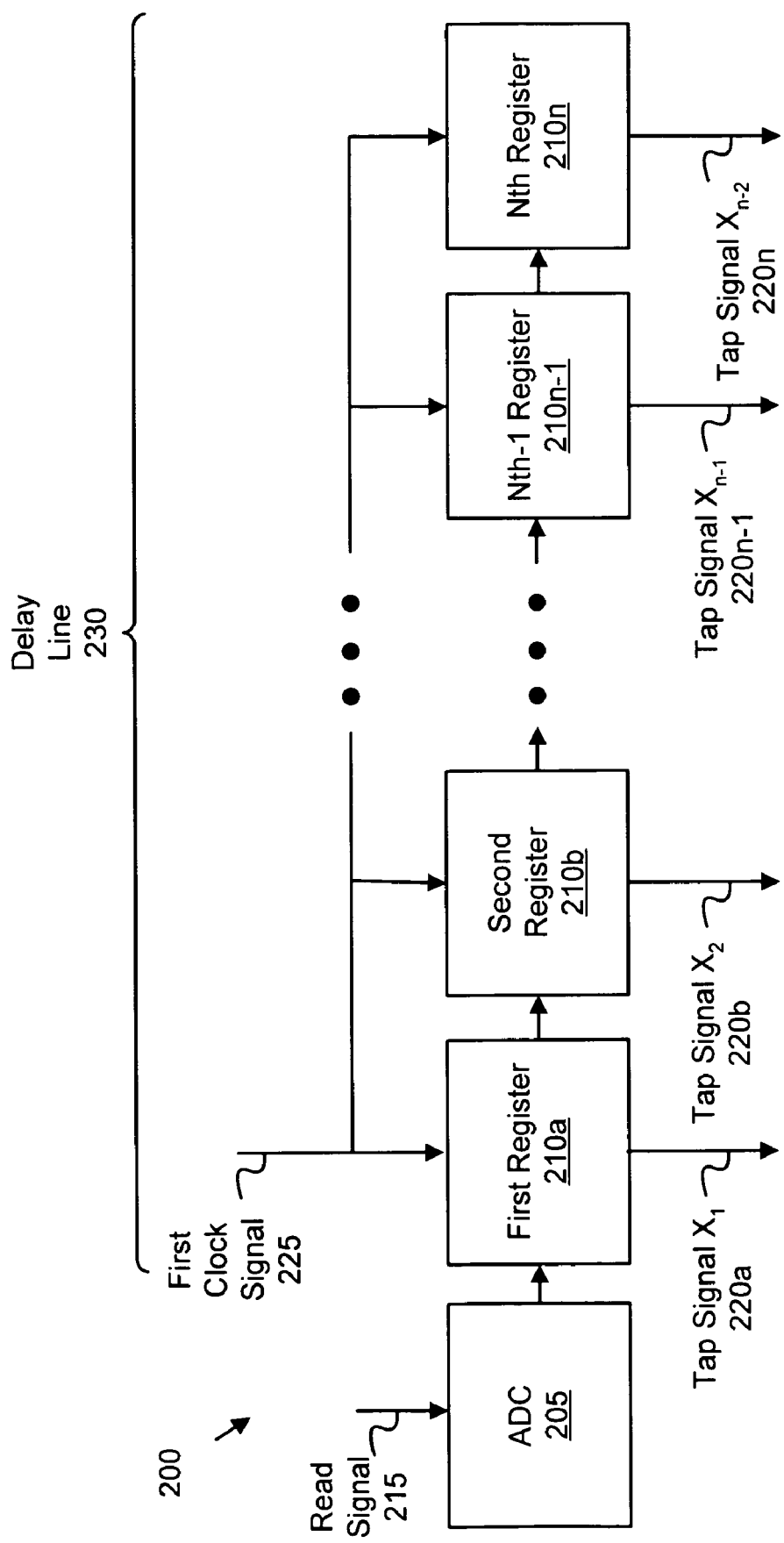
FIG. 2 is a schematic block diagram illustrating one embodiment of a sampling module of the present invention.

FIG. 2 is a schematic block diagram illustrating one embodiment of a sampling module 200 of the present invention. The sampling module 200 may be incorporated within the read channel module 120 of FIG. 1 in a manner that will be con described hereafter. In addition, the description of FIG. 2 may refer to elements of FIG. 1, like numbers referring to like elements. The sampling module 200 includes an analog to digital converter ("ADC") 205, one or more registers 210, a read signal 215, and one or more tap signals 220. Although for simplicity four registers 210 are depicted, any number of registers 210 may be employed.

The read signal 215 is the analog read signal from the read head 130 of FIG. 1. The ADC 205 samples the read signal 215, generating a digital value representing the analog voltage of the read signal 215 as is well know to those skilled in the art. In addition, the ADC 205 samples the read signal in an asynchronous time domain. In one embodiment, the asynchronous time domain employs a first sampling rate. A first register 210a stores the digital value generated by the ADC 205. In one embodiment, a first clock signal 225 oscillating at the first sampling rate loads the digital value into the first register 210a.

In addition, the first clock signal 225 loads each register 210 at the first sampling rate. Thus the first register 210a loads a first digital value during a first instance of the first clock signal 225, while a second register 210b loads the first digital value from the first register 210a as the first register 210a loads a second digital value from the ADC 205 during a second instance of the first clock signal 225. Thus each register 210 stores a digital value of the read signal 215 sampled during a progressively earlier sample interval. The registers 210 may be referred to collectively as a delay line 230. The digital value of each register 210 is available as a tap signal 220. Each tap signal 220 represents the digital value of a specified instance of the read signal 215.

Figure 3:
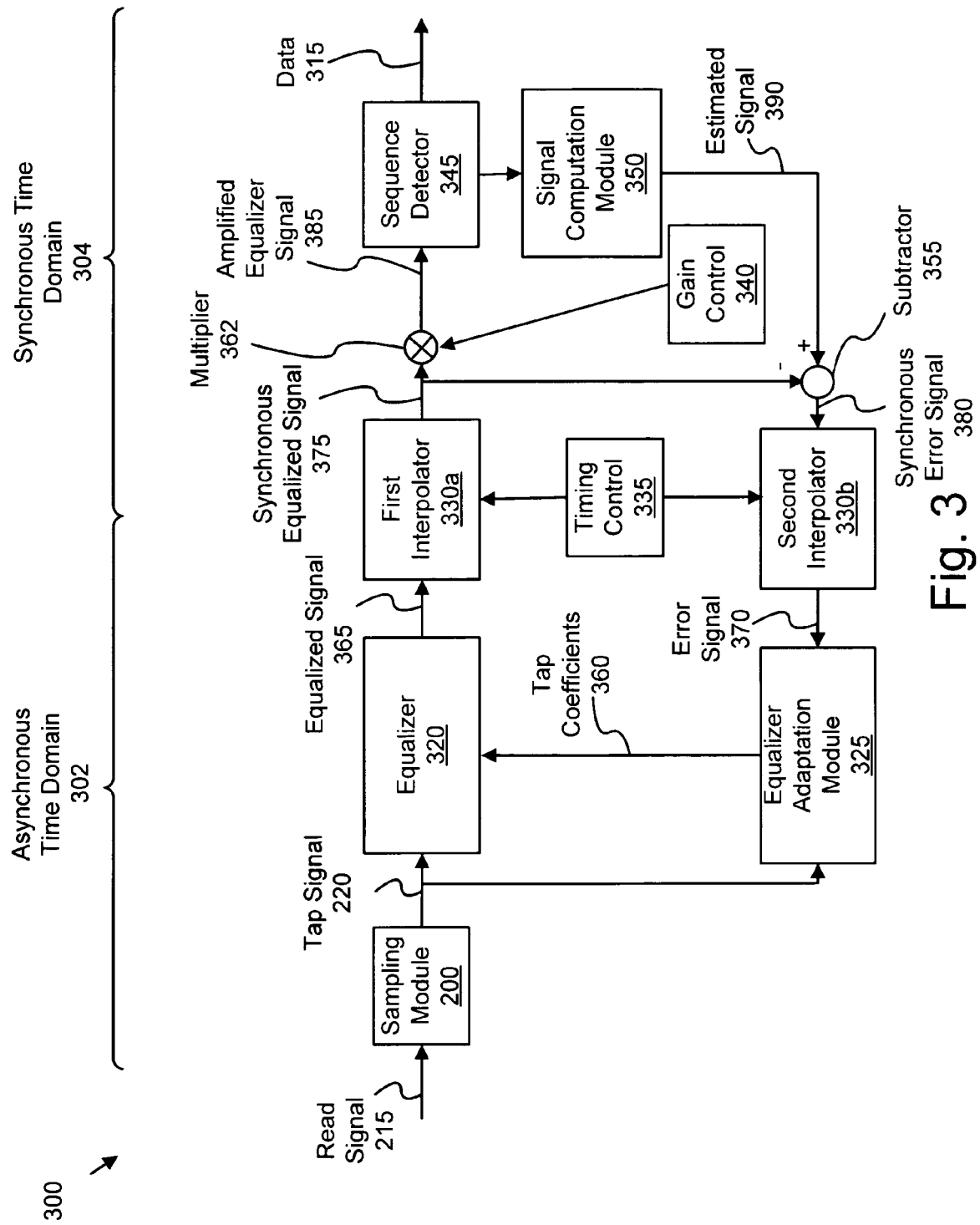
FIG. 3 is a schematic block diagram illustrating one embodiment of a read channel of the present invention.

FIG. 3 is a schematic block diagram illustrating one embodiment of a read channel 300 of the present invention. The description refers to elements of FIGS. 1-2, like numbers referring to like elements. The read channel 300 includes the sampling module 200 of FIG. 2, and an equalizer 320, first interpolator 330a, sequence detector 345, signal computation module 350, gain control 340, timing control 335, second interpolator 330b, and equalizer adaptation module 325.

The sampling module 200 samples the read signal 215 and outputs a plurality of tap signals 220 as described in FIG. 2. The equalizer 320 sums a product of each tap signal 220 and a corresponding tap coefficient 360 to form an equalized signal 365. In addition, the equalizer 320 sums the products in the asynchronous time domain 302 described in FIG. 2.

The first interpolator 330a interpolates the equalized signal 365 from the asynchronous time domain 302 into a synchronous time domain 304 as a synchronous equalized signal 375. The synchronous time domain 304 employs a second sampling rate. The second sampling rate may be a symbol-sampling rate such as the sample rate corresponding to the inverse of a data bit duration. In one embodiment, the first sampling rate is greater than the second sampling rate.

The multiplier 362 multiples the synchronous equalized signal 375 by a gain factor specified by the gain control 340 to form an amplified equalized signal 385. The sequence detector 345 detects data 315 from the amplified equalized signal 385. In one embodiment, the sequence detector 345 is configured as a maximum likelihood detector as is well known to those skilled in the art.

In one embodiment, the signal computation module 350 calculates an estimated signal 390 from the sequence detector 345. In addition, the signal computation module 350 may calculate the estimated signal 390 such that the estimated signal 390 has a target signal type. The target signal type may correspond to a $(1-D^2)$ PR4 polynomial, where D denotes a delay by one symbol interval, a $(1+D-D^2-D^3)$ extended PR4 ("EPR4") polynomial, a $(1+2D-2D^3-D^4)$ extended EPR4 ("EEPR4") polynomial, a generalized partial-response ("GPR") polynomial with noninteger coefficients, and a GPR polynomial for noise-predictive maximum-likelihood ("NPML") detection as is well known to those skilled in the art.

The subtractor 355 calculates a synchronous error signal 380 for each tap coefficient 360 as the difference between the estimated signal 390 and the synchronous equalized signal 375. The second interpolator 330b interpolates each synchronous error signal 380 into the asynchronous time domain 302 as an error signal 370.

The equalizer adaptation module 325 adapts each tap coefficient 360 as a leaky function of each tap coefficient 360 summed with a signal dependent updating function of the tap signal 220 and the error signal 370. The equalizer 320 employs the adapted tap coefficients 360 in equalizing the read signal 215.

Figure 4:
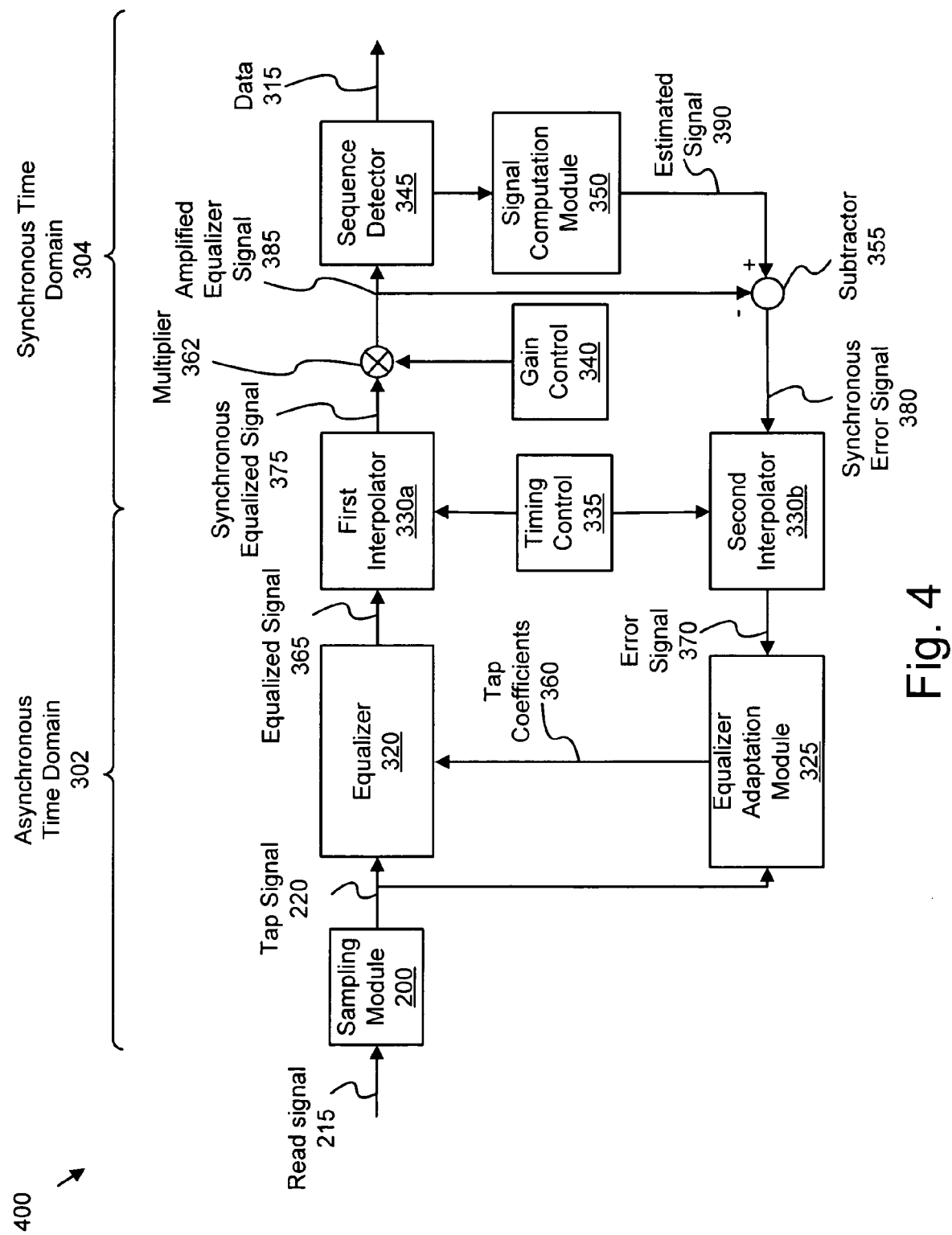
FIG. 4 is a schematic block diagram illustrating one alternate embodiment of a read channel of the present invention.

FIG. 4 is a schematic block diagram illustrating one alternate embodiment of a read channel 400 of the present invention. The read channel 400 includes the elements of FIG. 3, like numbers indicating like elements, performing the functions of depicted in FIG. 3, except that the subtractor 355 calculates the synchronous error signal 380 for each tap coefficient 360 as the difference between the estimated signal 390 and the amplified equalized signal 385.

Figure 5:
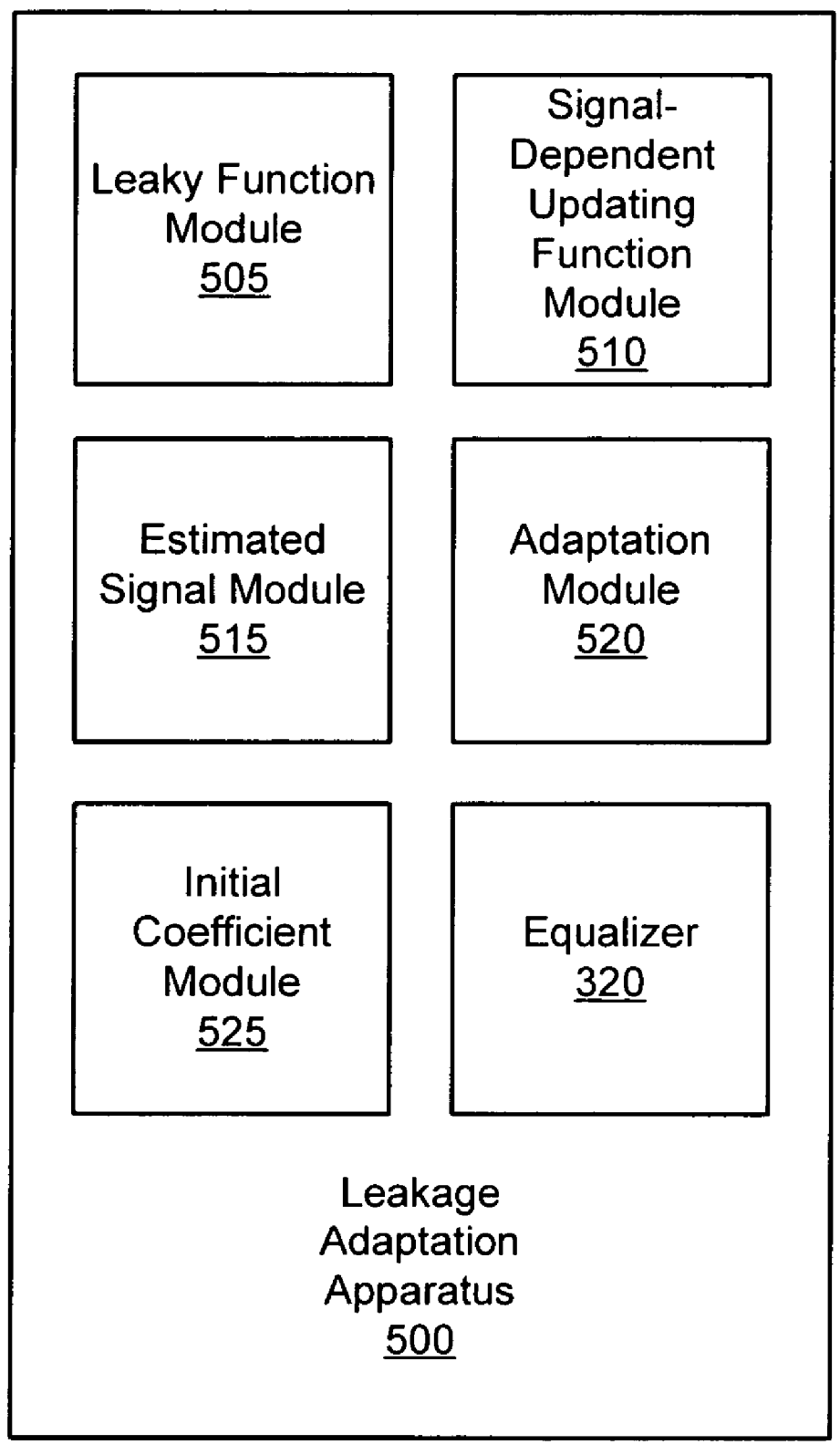
FIG. 5 is a schematic block diagram illustrating one embodiment of a leakage adaptation apparatus of the present invention.

FIG. 5 is a schematic block diagram illustrating one embodiment of a leakage adaptation apparatus 500 of the present invention. The apparatus 500 may be incorporated within the read channels 300, 400 of FIGS. 3 and 4 in a manner that will be described hereafter. Elements of FIGS. 1-4 are referred to herein, like numbers referring to like elements. As depicted, the apparatus 500 includes a leaky function module 505, signal-dependent updating function module 510, estimated signal module 515, adaptation module 520, initial coefficient module 525, and equalizer 320.

In one embodiment, the equalizer adaptation module 325 of FIGS. 3 and 4 embodies the leaky function module 505, the adaptation module 520, and the initial coefficient module 525. The sequence detector 345 and signal computation module 350 of FIGS. 3 and 4 may also embody the estimated signal module 515. The equalizer 320 is the equalizer 320 of FIGS. 3 and 4. The subtractor 355, second interpolator 330b, and equalizer adaptation module 325 may embody the signal-dependent updating function module 510.

The equalizer 320 sums products of the tap signals 220 and the corresponding tap coefficients 360 to form the equalized signal 365 in the asynchronous time domain 302. The leaky function module 505 calculates a leaky function for each tap coefficient 360 in the asynchronous time domain 302.

In one embodiment, the signal-dependent updating function module 510 calculates the synchronous error signal 380 for each tap signal 220 in the synchronous time domain 304. The signal-dependent updating function module 510 may calculate each synchronous error signal 380 as the difference between the estimated signal 390 and the synchronous equalized signal 375. In an alternate embodiment, the signal-dependent updating function module 510 calculates each synchronous error signal 380 as the difference between the estimated signal 390 and the amplified equalized signal 385. In a certain embodiment, the signal-dependent updating function 510 is a minus constant multiplied by the product of the synchronous error signal 380 interpolated into the asynchronous time domain 302 as the error signal 370 and the tap signal 220.

In a certain embodiment, the estimated signal module 515 calculates the estimated signal 390 from the synchronous equalized signal 375. In addition, the estimated signal module 515 may calculate the estimated signal 390 from the amplified equalized signal 385. Furthermore, the estimated signal module 515 may calculate the estimated signal 390 from the sequence detector 345. The estimated signal module 515 calculates the estimated signal 390 with a target signal type.

The adaptation module 520 adapts each of the tap coefficients 360 as the leaky function for each tap coefficient 360 summed in the asynchronous time domain 302 with the signal-dependent updating function for each tap coefficient 360. In one embodiment, the initial coefficient module 525 initializes each tap coefficient 360 to a specified initial value. The apparatus 500 adapts the tap coefficients 360, allowing the equalizer 320 to adapt to changes in read signal 215 characteristics.

Figure 6:
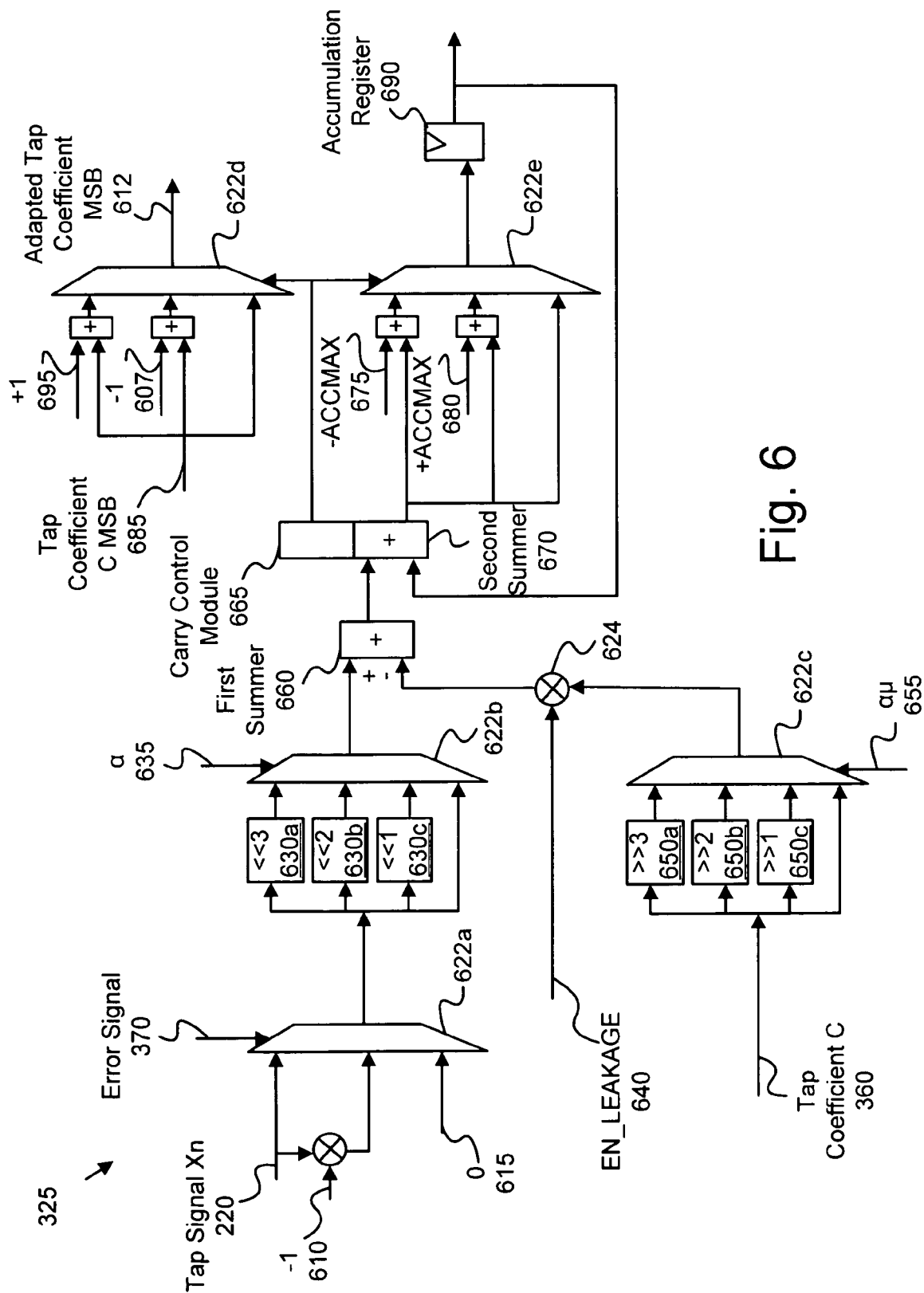
FIG. 6 is a schematic block diagram illustrating one embodiment of an equalization adaptation module of the present invention.

FIG. 6 is a schematic block diagram illustrating one embodiment of an equalization adaptation module 325 of FIGS. 3 and 4. The equalization adaptation module 325 embodies the leaky function module 505, signal-dependent updating function module 510, and adaptation module 520 of FIG. 5 in a manner that will be described hereafter. In addition, FIG. 6 refers to elements of FIGS. 1-5, like numbers referring to like elements. All signals and operations employ digital values and arithmetic as is well known to those skilled in the art.

With a first multiplexer 622a, the error signal 370 selects the tap signal 220 if the sign of the error signal 370 is a positive value, or the tap signal 220 multiplied by the value minus one (−1) 610 if the error signal 370 is a negative value, or the value zero (0) 615 if the error signal 370 is equivalent to zero (0). Thus the result of the first multiplexer 622a is equivalent to multiplying the tap signal 220 with the sign of the error signal 370 provided that the error signal 370 is nonzero. Otherwise, the result is equivalent to multiplying the tap signal 220 by a zero (0) error signal. The output of the first multiplexer 622a is multiplied by either eight (8), four (4), or (2) two by shifting the first multiplexer 622a output by three positions, two positions or one position to more significant positions, respectively, as shown by boxes 630, or multiplied by one, depending on the value of the parameter α 635 that controls the selection of the input to a second multiplexer 622b.

The tap coefficient 360 is divided by either eight (8), four (4), or (2) by shifting the tap coefficient by 3 positions, 2 positions or 1 position to the right, respectively, as shown by boxes 650, or multiplied by one, depending on the value of the parameter αμ 655 that controls the input of a third multiplexer 622c. A multiplier 624 multiplies the output of the third multiplexer 622c with the binary value EN_LEAKAGE 640. A first summer 660 sums the output of the second multiplexer 622b and the multiplier 624. If EN_LEAKAGE 640 is one (1), the leakage output signal of the third multiplexer 622c is enabled. Alternatively, if EN_LEAKAGE 640 is zero (0), the leakage output signal of the third multiplexer 622c is zero (0) or not enabled.

A second summer 670 sums the output of the first summer 660 with the output of an accumulation register 690. A carry control module 665 selects an input of a fourth and fifth multiplexer 622d, 622e. If the output of the second summer 670 is a saturated value wherein the digital value of the output exceeds the largest magnitude value that may be represented by the output, the carry control module 665 directs the fifth multiplexer 622e to select either the −ACCMAX 675 or +ACCMAX 680 values. The values −ACCMAX 675 or +ACCMAX 680 are a specified value such that the output of the fifth multiplexer 622e is an appropriate value such as all digital zeros or all digital ones when the output of the second summer 670 is saturated. The output of the fifth multiplexer 622e is stored in the accumulation register 690.

In addition, the carry control module 665 directs the fourth multiplexer 622d to select either the most significant bits ("MSB") of the tap coefficient 685, the tap coefficient MSB 685 plus one (1) 695, or the tap coefficient MSB 685 plus minus one (−1) 607. The output of the fourth multiplexer 622d is the adapted tap coefficient MSB 612 while the output of the accumulation register 690 is the adapted tap coefficient least-significant bits ("LSB") 614. The depicted equalizer adaptation module 325 may be replicated for each tap coefficient 360. In addition, the depicted equalizer adaptation module 325 reduces the semiconductor gates required to perform the operations of the equalizer adaptation module 325.

Figure 7:
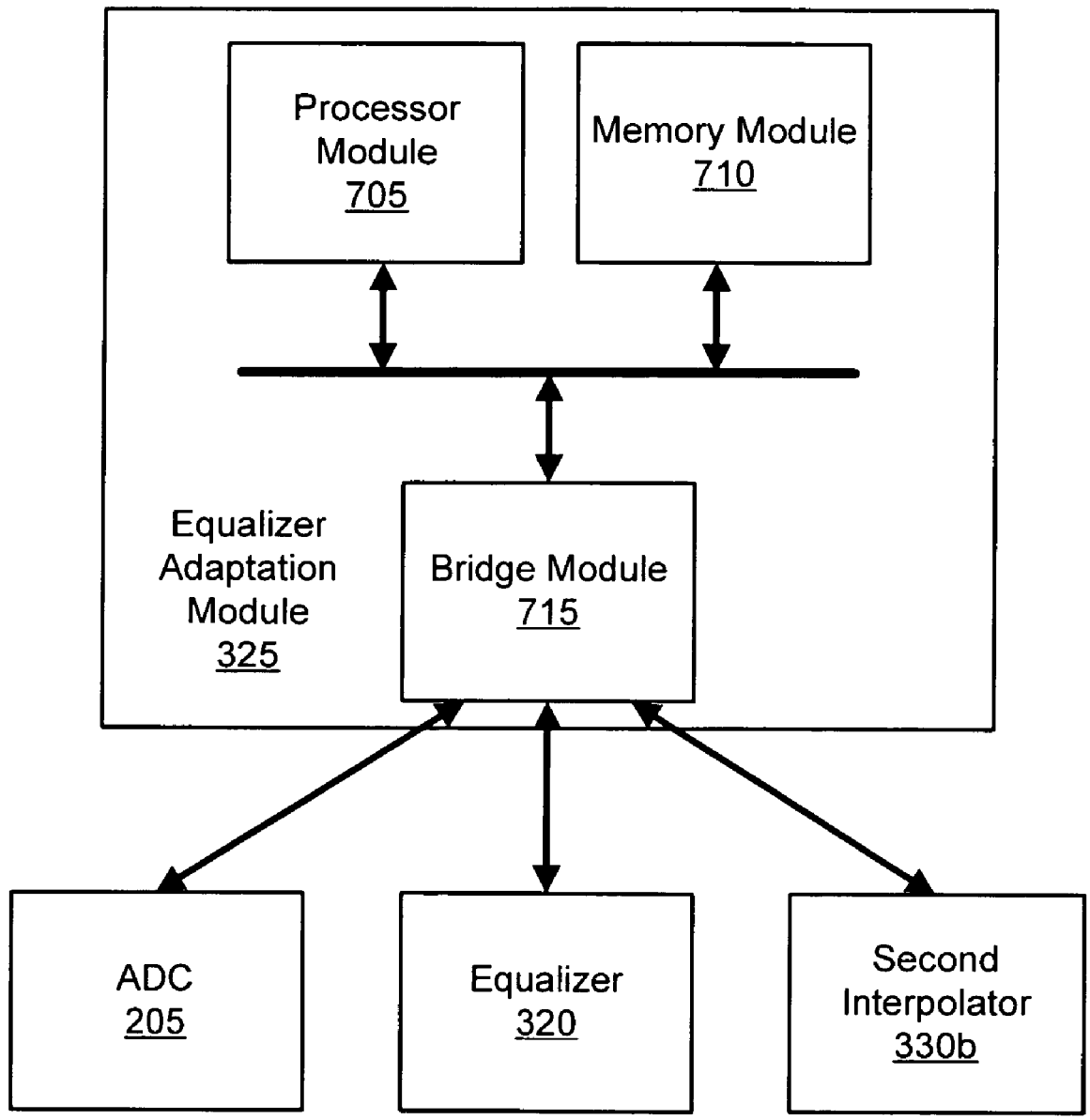
FIG. 7 is a schematic block diagram illustrating one alternate embodiment of an equalization adaptation module of the present invention.

FIG. 7 is a schematic block diagram illustrating one alternate embodiment of an equalizer adaptation module 325 of the present invention. The module 325 may be an alternate embodiment of the equalizer adaptation module 325 of FIGS. 3 and 4. The module 325 includes a processor module 705, a memory module 710, and a bridge module 715. In addition, the module 325 is depicted in communication with the ADC 205 of FIG. 2 and the equalizer 320 and second interpolator 330b of FIGS. 3 and 4.

The processor module 705, memory module 710, and bridge module 715 may be fabricated of semiconductor gates on one or more semiconductor substrates. Each semiconductor substrate may be packaged in one or more semiconductor devices mounted on circuit cards. Connections between the processor module 705, the memory module 710, and the bridge module 715 may be through semiconductor metal layers, substrate to substrate wiring, or circuit card traces or wires connecting the semiconductor devices.

The memory module 710 stores software instructions and data. The processor module 705 executes the software instructions and manipulates the data as is well known to those skilled in the art. The processor module 705 communicates with the ADC 205, the equalizer 320, and the second interpolator 330b through the bridge module 715. In one embodiment, the memory module 710 stores and the processor module 705 executes one or more software processes embodying the leaky function module 505, signal-dependent updating function module 510, estimated signal module 515, adaptation module 325, and initial coefficient module 525 of FIG. 5.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
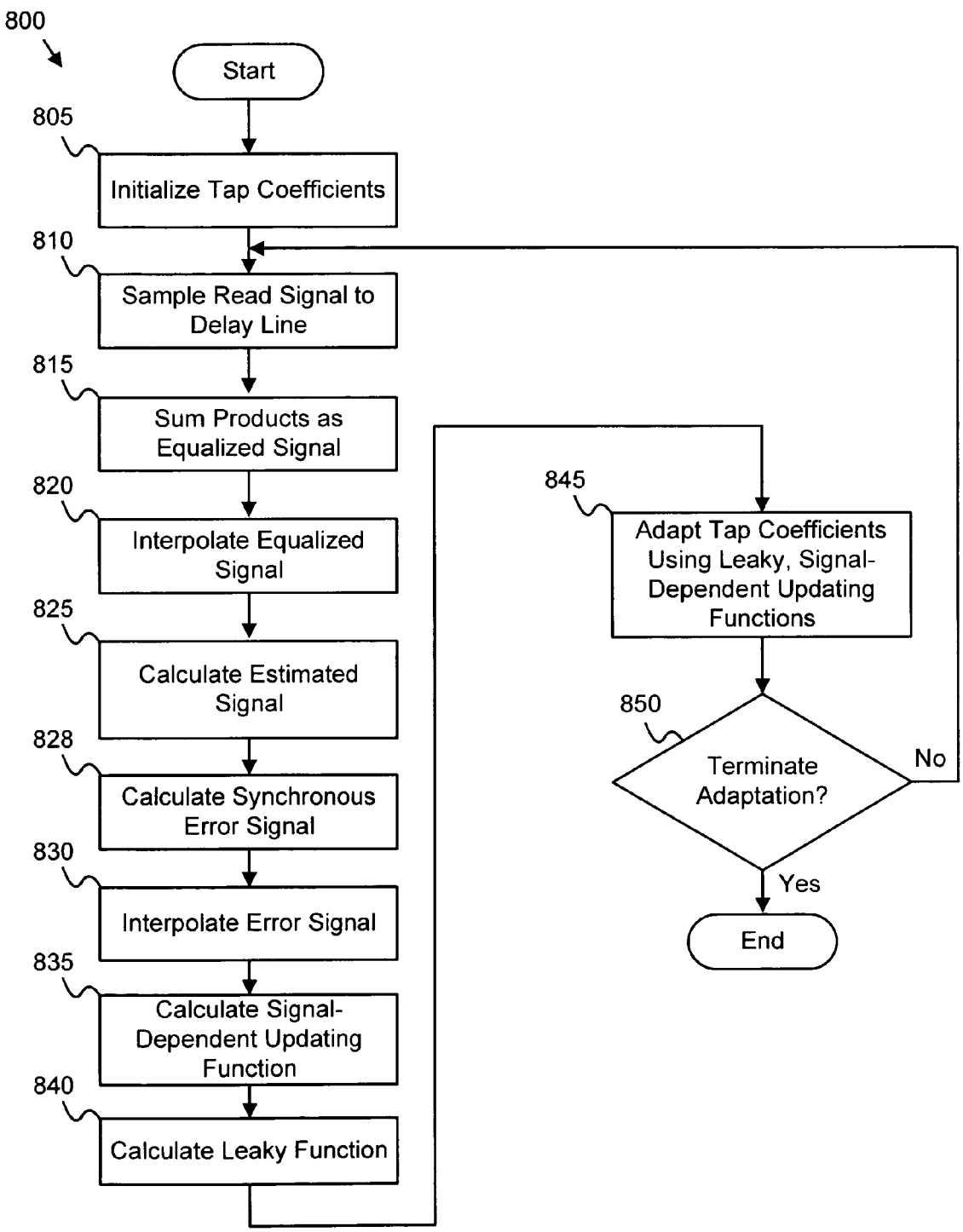
FIG. 8 is a schematic flow chart diagram illustrating one embodiment of a leaky adaptation method of the present invention.

FIG. 8 is a schematic flow chart diagram illustrating one embodiment of a leaky adaptation method 800 of the present invention. The method 800 substantially includes the steps necessary to carry out the functions presented above with respect to the operation of the described system 100, 300, 400, and apparatus 200, 500 600, 700 of FIGS. 1-7. In addition, the description of FIG. 8 references elements of FIGS. 1-7, like numbers referring to like elements.

The method 800 begins and in one embodiment, the initial coefficient module 525 initializes 805 the tap coefficients 360 to initial values. The initial coefficient module 525 may initialize 805 each tap coefficient 360 to a value specified for the tap coefficient 360. Alternatively, the initial coefficient module 525 may initialize 805 all tap coefficients to a common initial value.

In one embodiment, the ADC 205 samples 810 the read signal 215 to the delay line 230 in the asynchronous time domain 302. The equalizer 320 sums 815 products of the tap signals 220 from the delay line 230 and the corresponding tap coefficients 360 to form the equalized signal 365 in the asynchronous time domain 302. In one embodiment, the equalizer 320 employs Equation 1, where $c_{i,n}$ is the tap coefficient 360 for each tap signal 220 i at time index n, $x_i$ is the tap signal 220 for each i, and N is the number of tap signals 220.

$$Z_n = \sum_{i=0}^{N-1} c_{i,n} x_{n-i} \quad \text{Equation 1}$$

The first interpolation module 330a interpolates 820 the equalized signal 365 into the synchronous time domain 304 as the synchronous equalized signal 375. In one embodiment, the first interpolation module 330a interpolates 820 the equalized signal 365 as a weighted average of a first equalized signal 365 and a second equalized signal 365. For example, if the first equalized signal 365 is available at the first clock signal 225 of the first sample rate twenty nanoseconds (20 ns) before a clock of the second sample rate while the second equalized signal 365 is available ten nanoseconds (10 ns) after the clock of the second sample rate, the first interpolation module 330a may calculate the synchronous equalized signal 375 as two times the second equalized signal 365 plus the first equalized signal 365 all divided by three.

In one embodiment, the estimated signal module 515 calculates 825 the estimated signal 390 from the synchronous equalized signal 375. In an alternate embodiment, the estimated signal module 515 calculates 825 the estimated signal 390 from the amplified equalized signal 385. In another alternate embodiment, the estimated signal module 515 calculates 825 the estimated signal 390 from the sequence detector 345. The estimated signal module 515 calculates 825 the estimated signal 390 as a target signal type. The target signal type may be specified by a PR4 polynomial, an EPR4 polynomial, an EEPR4 polynomial, a GPR polynomial with noninteger coefficients, and a GPR polynomial for NPML detection as is well known to those skilled in the art.

In one embodiment, the signal-dependent updating function module 510 calculates 828 a synchronous error signal 380 for each tap signal 220. In a certain embodiment, the signal-dependent updating function module 510 calculates 828 the synchronous error signal 380 as the estimated signal 390 minus the synchronous equalized signal 375. In an alternate embodiment, the signal-dependent updating function module 510 calculates 828 the synchronous error signal 380 as the estimated signal 390 minus the amplified equalized signal 385.

In one embodiment, the second interpolation module 330b interpolates 830 the synchronous error signal 380 into the asynchronous time domain 302 as the error signal 370. The second interpolation module 330b may interpolate 830 the error signal 370 as the weighted average of one or more error signal values of the synchronous error signal 380.

In one embodiment, the signal-dependent updating function module 510 calculates 835 the signal-dependent updating function for each tap coefficient 360 using Equation 2, where $\alpha$ 635 is a constant parameter, $e_n$ is the error signal 370, and $x_{n-i}$ is the tap signal 220.

$$(-\alpha e_n x_{n-i}) \qquad \text{Equation 2}$$

The leaky function module 505 calculates 840 a leaky function for each tap coefficient in the asynchronous time domain 302. In one embodiment, the leaky function is calculated 840 using Equation 3, where $\mu$ is a constant parameter, and $f(c_{i,n})$ is a coefficient function of the tap coefficient $c_{i,n}$ 360 for the tap signal 220.

$$c_{i,n} - \alpha \mu f(c_{i,n}) \qquad \text{Equation 3}$$

In one embodiment, $\alpha\mu$ is in the range of 0.0001 to 0.2. The value $\alpha\mu$ controls the tap leakage process by determining the amount of leakage. Thus, the larger the value of $\alpha\mu$ the larger the leakage. In a certain embodiment, the coefficient function $f(c_{i,n})$ is calculated using Equation 4. In an alternate embodiment, function $f(c_{i,n})$ is calculated using Equation 5.

$$f(c_{i,n}) = c_{i,n} \qquad \text{Equation 4}$$

$$f(c_{i,n}) = sgn(c_{i,n}) \qquad \text{Equation 5}$$

The adaptation module 520 adapts 845 each of the tap coefficients 360 as the leaky function for each tap coefficient summed with the signal-dependent updating function for each tap coefficient. In one embodiment, the adaptation module 520 adapts 845 each tap coefficient 360 using Equation 6 where n+1 indicates the tap coefficient for a next sampling interval.

$$c_{i,n+1} = c_{i,n} - \alpha\mu f(c_{i,n}) - \alpha e_n x_{n-i} \qquad \text{Equation 6}$$

In addition, the adaptation module 520 may determine 850 if the leaky adaptation method 800 terminates. If the adaptation module 520 determines 850 the method 800 does not terminate, the method 800 loops and the ADC 205 samples 810 the read signal 215. If the adaptation module 520 determines 850 the method 800 terminates, the method 800 ends. The method 800 adapts 845 the tap coefficients 360 to allow the equalizer 320 to adapt to changes in read signal 215 characteristics while stabilizing tap coefficient 360 drift.

Figure 9:
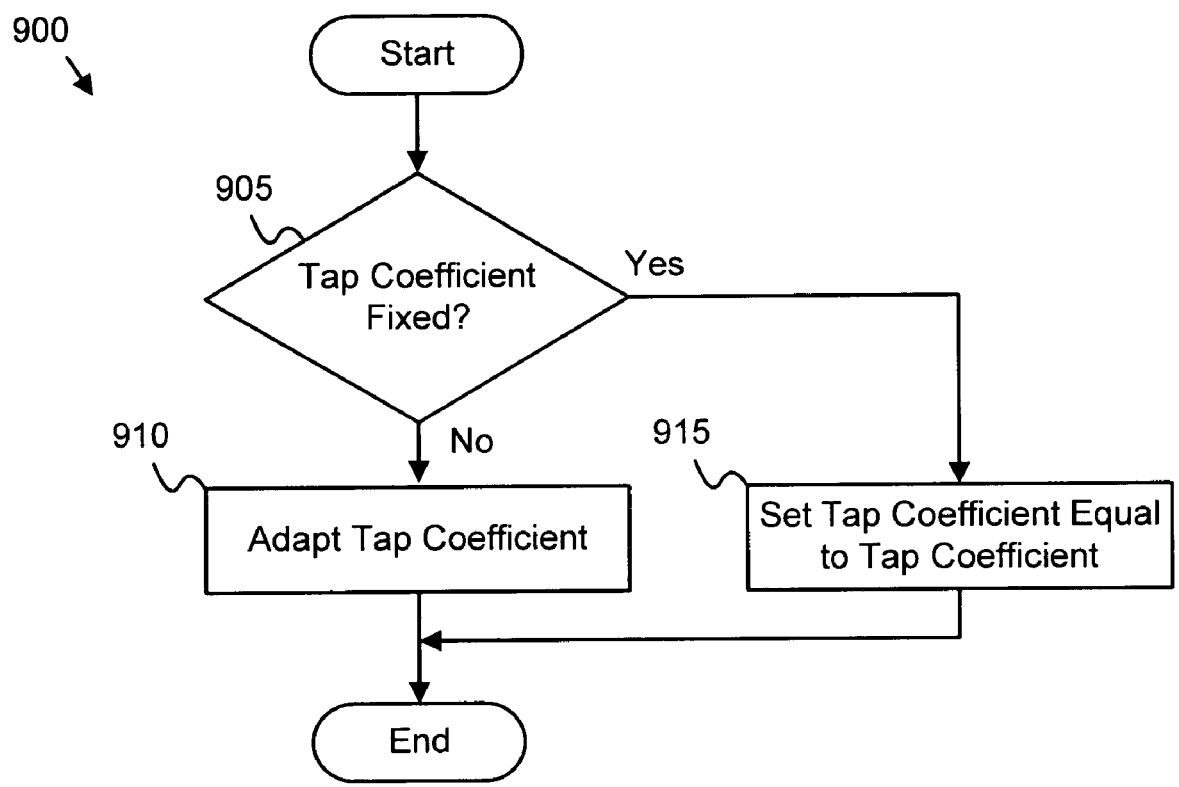
FIG. 9 is a schematic flow chart diagram illustrating one embodiment of a coefficient fixing method in accordance with the present invention.

FIG. 9 is a schematic flow chart diagram illustrating one embodiment of a coefficient fixing method 900 in accordance with the present invention. The method 900 substantially includes the steps necessary to carry out the functions presented above with respect to the operation of the described system 100, 300, 400, apparatus 200, 500 600, 700, and method 800 of FIGS. 1-8. In addition, the description of FIG. 9 references elements of FIGS. 1-7, like numbers referring to like elements.

The method 900 begins and in one embodiment, the adaptation module 520 determines 905 if a tap coefficient 360 is fixed. If the adaptation module 520 determines 905 the tap coefficient 360 is not fixed, the adaptation module 520 adapts 910 the tap coefficient 360 as described by the method 800 of FIG. 8 and the method 900 ends. For example, the adaptation module 520 may adapt 910 the tap coefficient 360 using Equation 6.

If the adaptation module 520 determines 905 the tap coefficient 360 is fixed, the adaptation module 520 sets 915 the tap coefficient 360 equal to the tap coefficient 360 itself and the method 900 ends. In one embodiment, the adaptation module 520 employs Equation 7 to set 915 the tap coefficient 360 equal to itself.

$$c_{i,n+1} = c_{i,n} \qquad \text{Equation 7}$$

Equalizer functions have traditionally fixed one or more tap coefficients 360 to increase the stability of the equalizer function by preventing the equalizer function from adapting to an extreme or unstable state. The present invention may reduce the number of tap coefficients 360 that must be fixed to maintain equalizer function stability as the leaky function moderates any increase in the value of each tap coefficient 360.

Figure 10:
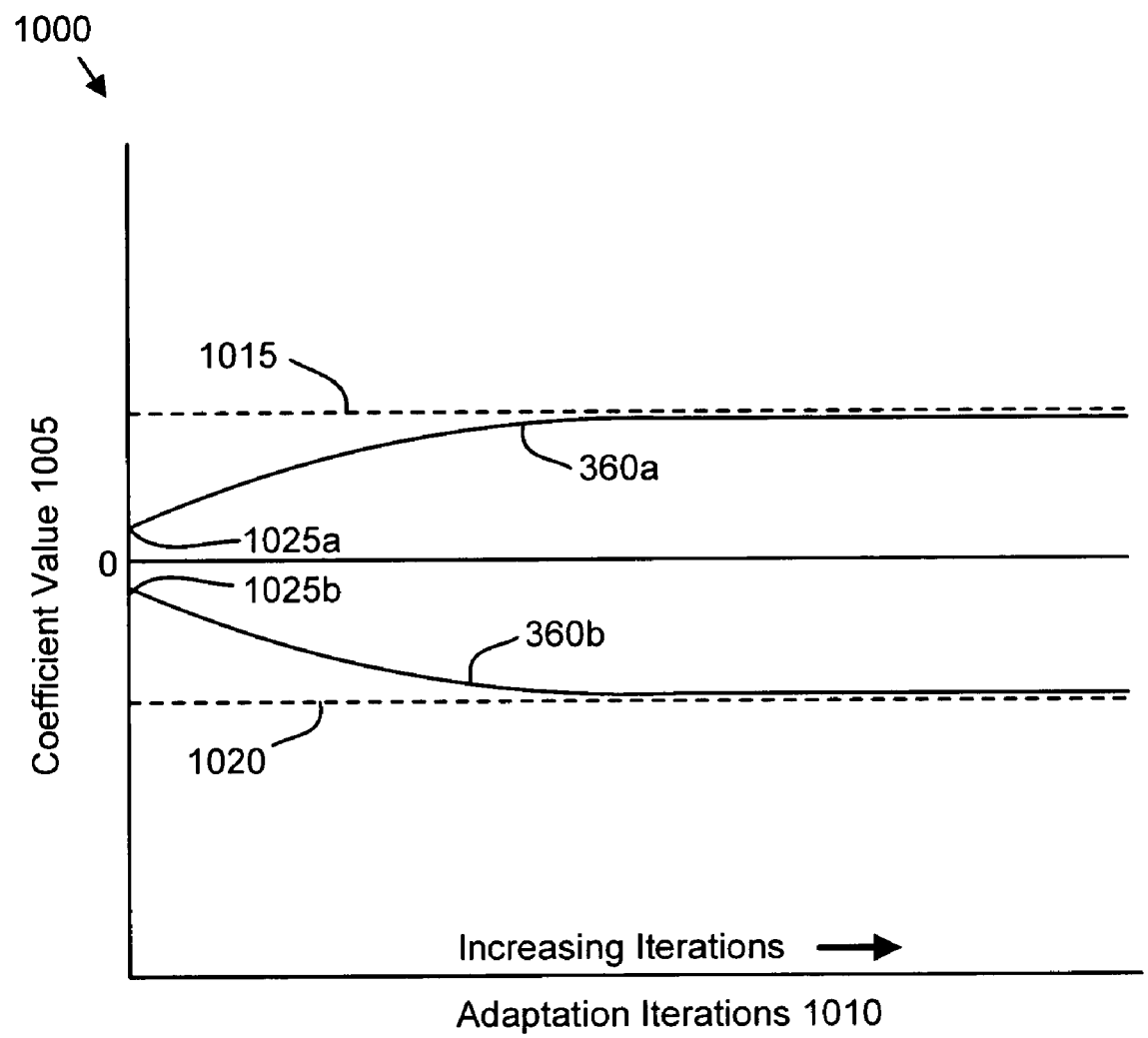
FIG. 10 is a graph illustrating one embodiment of coefficient adaptation without leakage.

FIG. 10 is a graph 1000 illustrating one embodiment of coefficient adaptation without leakage. The graph 1000 shows the coefficient values 1005 of one or more tap coefficients 360 for a progressive number of adaptation iterations 1010. A first and second tap coefficient 360a, 360b are initialized to a first and second initial value 1025a, 1025b respectively. The tap coefficients 360 are subsequently adapted without leakage. The absolute coefficient values 1005 of the tap coefficients 360 increase until the coefficient values 1005 of the tap coefficients 360 are constrained by upper and lower bounds 1015, 1020. The upper and lower bounds 1015, 1020 may be established to stabilize an equalizer function.

Figure 11:
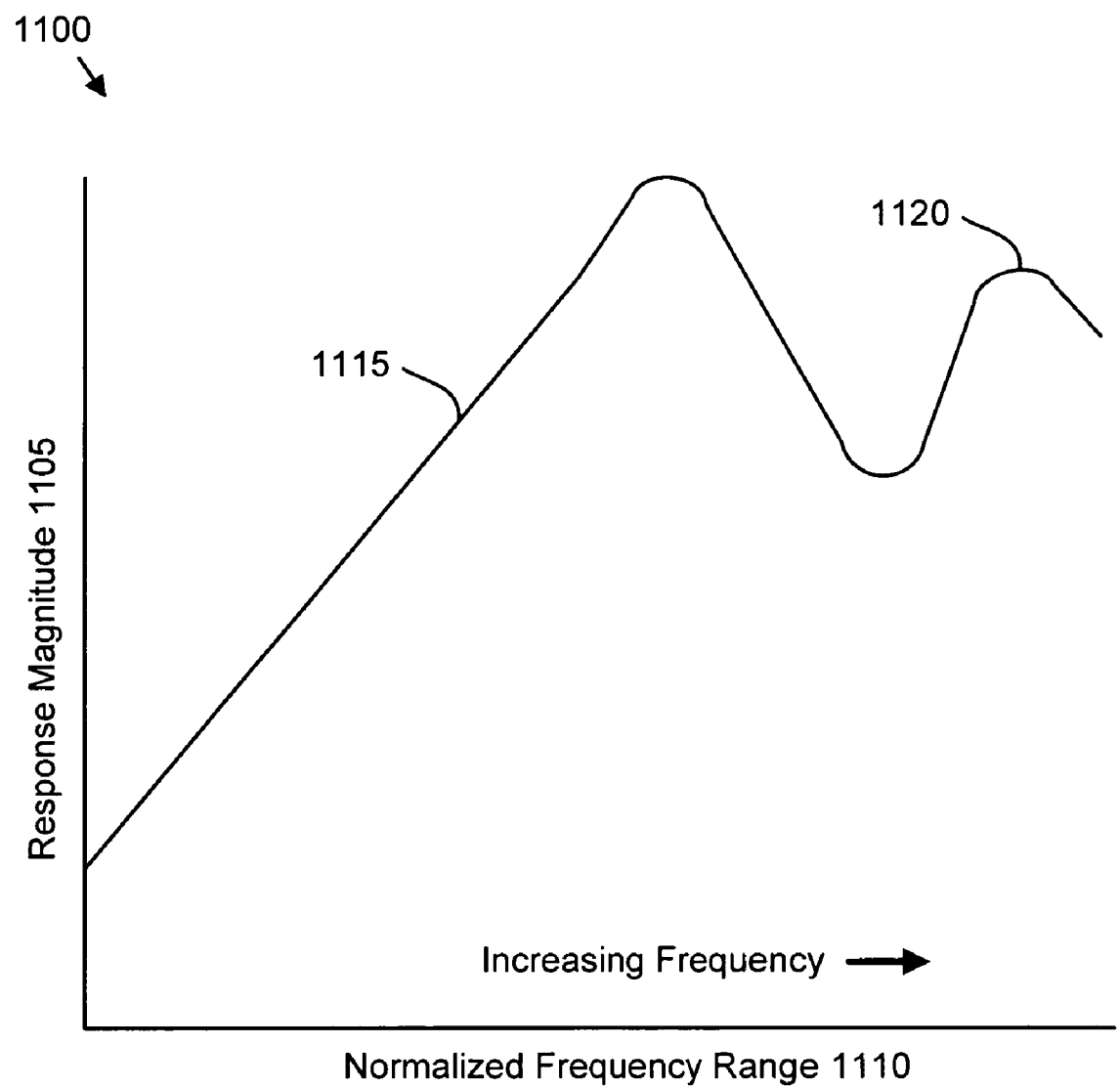
FIG. 11 is a graph illustrating one embodiment of frequency response without leakage.

FIG. 11 is a graph 1100 illustrating one embodiment of frequency response without leakage. The graph 1100 shows the response magnitude 1105 of an equalized signal 1115 over a normalized frequency range 1110. The equalized signal 1115 is calculated with tap coefficients 360 that are adapted without leakage. The graph 1100 depicts a high response magnitude 1120 for higher frequencies although there is little or no energy in the signal at the higher frequencies. The adaptation of the tap coefficients 360 without leakage results in a high response for low energy, high frequency equalized signal 1115 components.

Figure 12:
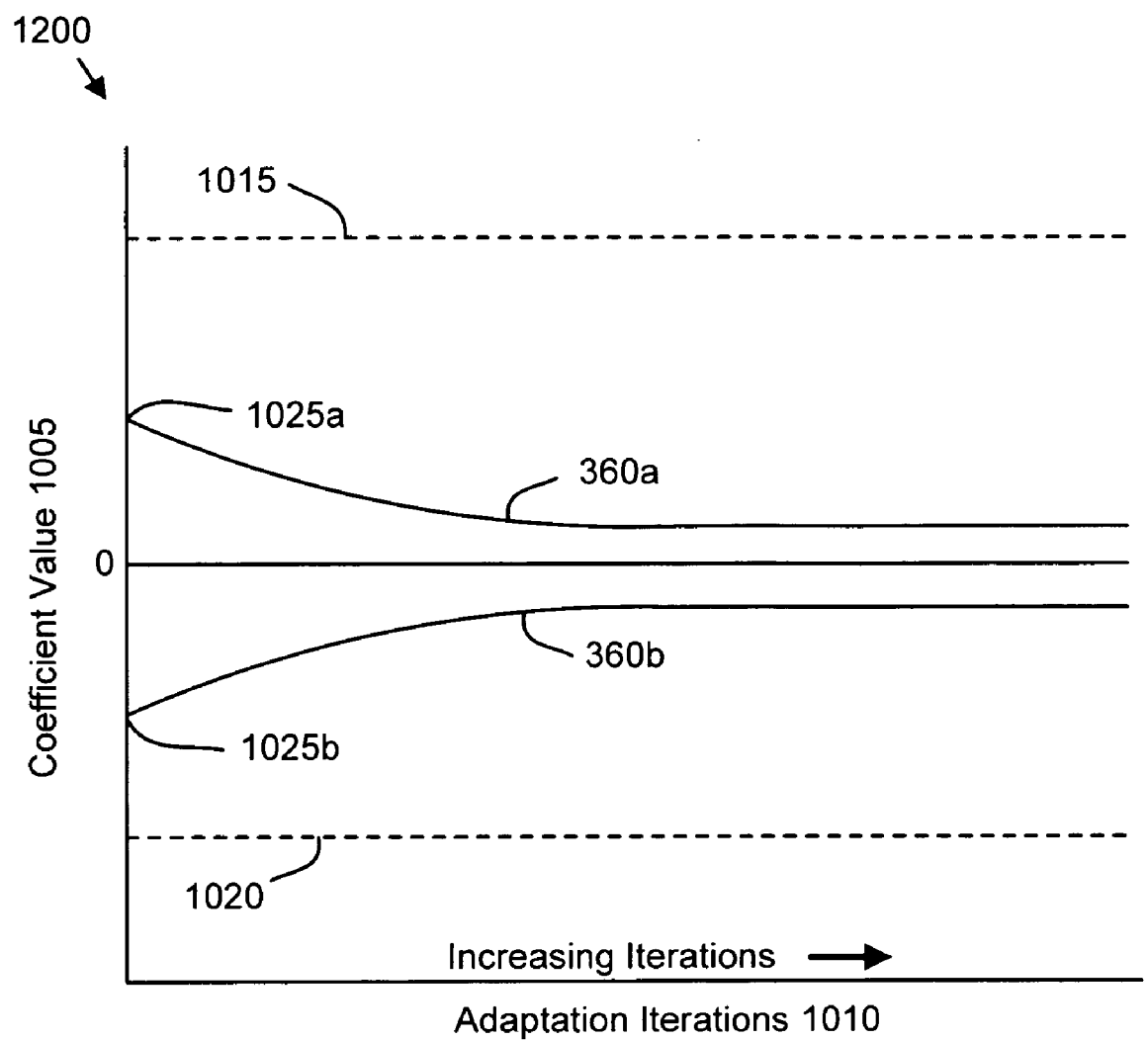
FIG. 12 is a graph illustrating one embodiment of coefficient adaptation of the present invention.

FIG. 12 is a graph 1200 illustrating one embodiment of coefficient adaptation of the present invention. The graph 1200 may be the graph 1000 of FIG. 10 with a modified coefficient value 1005 scale such that the upper and lower bounds 1015, 1020 represent the same coefficient values 1005 of FIG. 10. As depicted, the first and second tap coefficients 360a, 360b are initialized to the first and second initial value 1025a, 1025b respectively. The tap coefficients 360 are subsequently adapted with a leaky function of the embodiment of the present invention. The leaky function constrains the energy of the coefficient values 1005 of the tap coefficients 360 and the tap coefficients 360 converge on stable values.

Figure 13:
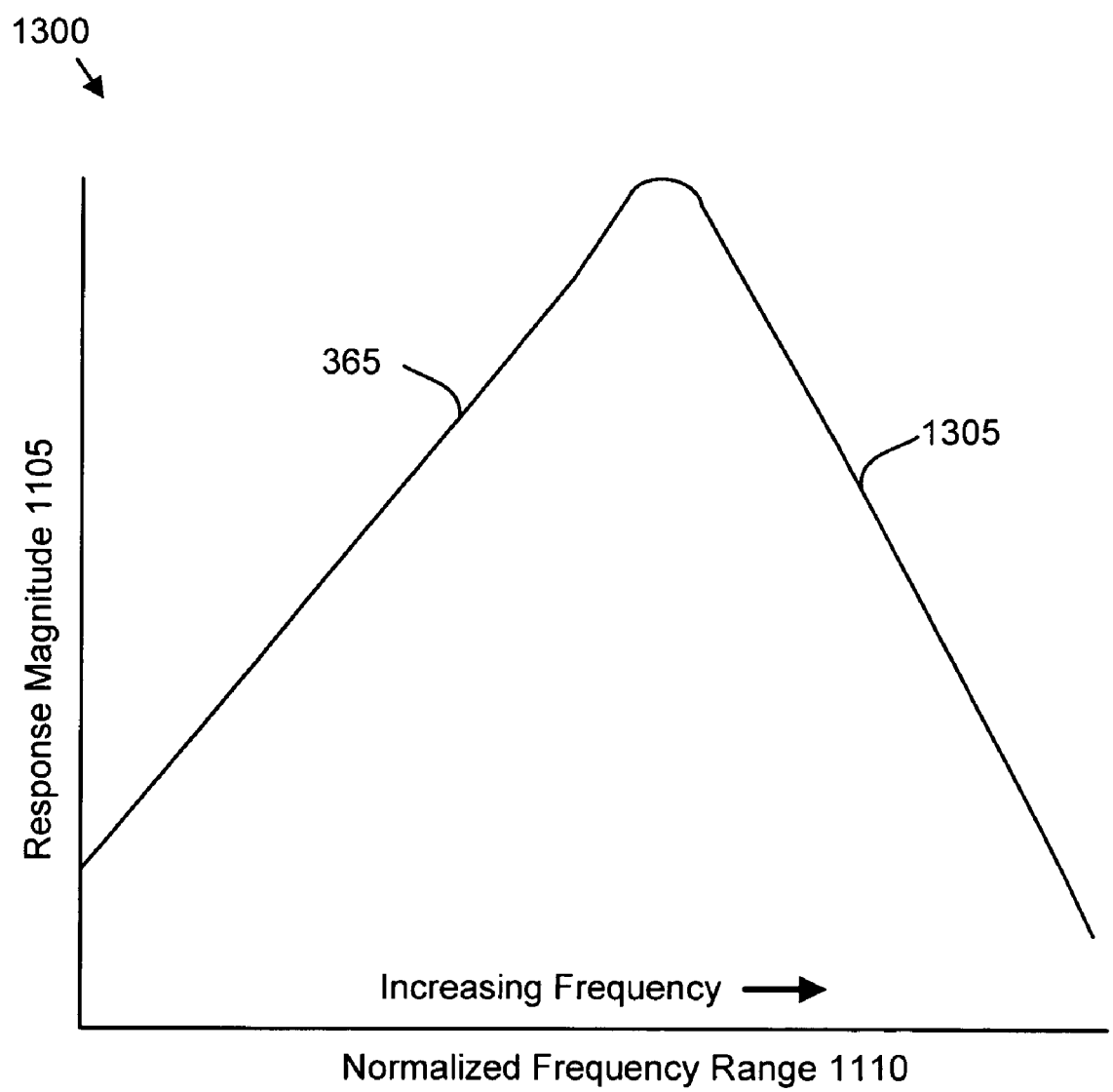
FIG. 13 is a graph illustrating one embodiment of frequency response of the present invention.

FIG. 13 is a graph 1300 illustrating one embodiment of frequency response of the present invention. The graph 1300 maybe the graph 1100 of FIG. 11 with an equalized signal 365 calculated with tap coefficients 360 adapted 845 using leakage. As depicted, a higher frequency response 1305 rolls off. The high frequency response 1305 corresponds to a low energy of high frequency components of the read signal 215.

The embodiment of the present invention adapts 845 tap coefficients 360 using a leaky function allowing an asynchronous equalizer 320 to adapt to changing read signal 215 characteristics while stabilizing tap coefficient 360 drift. In addition, the embodiment of the present invention supports the attenuation of higher frequency signals with low signal energy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to adapt tap coefficients, the apparatus comprising:
an equalizer configured to sum products of a plurality of tap signals from a delay line sampling a read signal and a plurality of corresponding tap coefficients to form an equalized signal in an asynchronous time domain having a first sampling rate;
a leaky function module configured to calculate a leaky function for each tap coefficient in the asynchronous time domain; and
an adaptation module configured to adapt each of the tap coefficients as the leaky function for each tap coefficient summed with a signal-dependent updating function for each tap coefficient calculated in a synchronous time domain having a second sampling rate and interpolated into the asynchronous time domain.

2. The apparatus of claim 1, further comprising a signal-dependent updating function module configured to calculate an error signal for each tap signal as the difference between the equalized signal interpolated into the synchronous time domain and an estimated signal.

3. The apparatus of claim 2, further comprising an estimated signal module configured to calculate the estimated signal from the equalized signal interpolated into the synchronous time domain wherein the equalized signal has a target signal type selected from a $(1-D^2)$ partial response class-4 ("PR4") polynomial, where D denotes a delay by one symbol interval, a $(1+D-D^2-D^3)$ extended PR4 ("EPR4") polynomial, a $(1+2D-2D^3-D^4)$ extended EPR4 ("EEPR4") polynomial, a generalized partial-response ("GPR") polynomial with noninteger coefficients, and a GPR polynomial for noise-predictive maximum-likelihood ("NPML") detection.

4. The apparatus of claim 2, wherein the signal-dependent updating function is $(-\alpha e_n x_{n-i})$ where $\alpha$ is a constant parameter, $e_n$ is the error signal for the tap signal, and $x_{n-i}$ is the tap signal, and wherein the leaky function of each tap coefficient is $c_{i,n}-\alpha\mu f(c_{i,n})$ where $\mu$ is a constant parameter, and $f(c_{i,n})$ is a coefficient function of the tap coefficient $c_{i,n}$ for the tap signal.

5. The apparatus of claim 4, wherein the coefficient function $f(c_{i,n})$ is equal to $c_{i,n}$.

6. The apparatus of claim 4, wherein the coefficient function $f(c_{i,n})$ is equal to the sign of $c_{i,n}$.

7. The apparatus of claim 4, wherein $\mu$ is selected so that $\alpha\mu$ is in the range of 0.0001 to 0.2 and $\alpha\mu$ controls a tap leakage process.

8. The apparatus of claim 1, wherein the first sampling rate is greater than the second sampling rate and the second sampling rate is a symbol-sampling rate.

9. A system to adapt tap coefficients, the system comprising:
a communication module configured to communicate with a host;
a control module configured to control system functions;
a write channel module configured to write data to a storage media through a write head;
a read channel module configured to read data from the storage media through a read head and comprising
an equalizer configured to sum products of a plurality of tap signals from a delay line sampling a read signal from the read head and a plurality of corresponding tap coefficients to form an equalized signal in an asynchronous time domain having a first sampling rate;
a leaky function module configured to calculate a leaky function for each tap coefficient in the asynchronous time domain; and
an adaptation module configured to adapt each of the tap coefficients as the leaky function for each tap coefficient summed with a signal-dependent updating function for each tap coefficient calculated in a synchronous time domain having a second sampling rate and interpolated into the asynchronous time domain.

10. The system of claim 9, further comprising a signal-dependent updating function module configured to calculate an error signal for each tap signal as the difference between the equalized signal interpolated into the synchronous time domain and an estimated signal, wherein the estimated signal is calculated from the equalized signal interpolated into the synchronous time domain and has a target signal type selected from a $(1-D^2)$ partial response class-4 ("PR4")polynomial, where D denotes delay by one symbol interval, a $(1+D-D^2-D^3)$ extended PR4 ("EPR4") polynomial, a $(1+2D-2D^3-D^4)$ extended EPR4 ("EEPR4") polynomial, a generalized partial-response ("GPR") polynomial with noninteger coefficients, and a GPR polynomial for noise-predictive maximum-likelihood ("NPML") detection.

11. The system of claim 10, wherein the signal-dependent updating function is $(-\alpha e_n x_{n-i})$ where $\alpha$ is a constant parameter, $e_n$ is the error signal for the tap signal, and $x_{n-i}$ is the tap signal, and wherein the leaky function of each tap coefficient is $c_{i,n}-\alpha\mu f(c_{i,n})$ where $\mu$ is a constant parameter, and $f(c_{i,n})$ is a coefficient function of each tap coefficient $c_{i,n}$ for the tap signal.

12. A method for deploying computer infrastructure, comprising integrating computer-readable code into a computing system, the computing system comprising a processor and a memory, wherein the code in combination with the computing system is capable of performing the following:

summing products of a plurality of tap signals from a delay line sampling a read signal and a plurality of corresponding tap coefficients to form an equalized signal in an asynchronous time domain having a first sampling rate;

calculating a leaky function for each tap coefficient in the asynchronous time domain; and adapting each of the tap coefficients as the leaky function for each tap coefficient summed with a signal-dependent updating function for each tap coefficient calculated in a synchronous time domain having a second sampling rate and interpolated into the asynchronous time domain.

13. The method of claim 12, wherein the signal-dependent updating function comprises calculating an error signal for each tap signal as the difference between the equalized signal interpolated into the synchronous time domain and an estimated signal.

14. The method of claim 13, wherein the estimated signal is calculated from the equalized signal interpolated into the synchronous time domain and has a target signal type selected from a $(1-D^2)$ partial response class-4 ("PR4")polynomial, where D denotes delay by one symbol interval, a $(1+D-D^2-D^3)$ extended PR4 ("EPR4") polynomial, a $(1+2D-2D^3-D^4)$ extended EPR4 ("EEPR4"polynomial, a generalized partial-response ("GPR") polynomial with noninteger coefficients, and a GPR polynomial for noise-predictive maximum-llikelihood ("NPML") detection.

15. The method of claim 14, wherein the signal-dependent updating function is calculated as $(-\alpha e_n x_{n-i})$ where $\alpha$ is a constant parameter, $e_n$ is the error signal for the tap signal, and $x_{n-i}$ is the tap signal, and wherein the leaky function of each tap coefficient is $c_{i,n}-\alpha\mu f(c_{i,n})$ where $\mu$ is a constant parameter, and $f(c_{i,n})$ is a coefficient function of each tap coefficient $c_{i,n}$ for the tap signal.

16. The method of claim 15, wherein the coefficient function $f(c_{i,n})$ is equal to $c_{i,n}$.

17. The method of claim 15, wherein the coefficient function $f(c_{i,n})$ is equal to the sign of $c_{i,n}$.

18. The method of claim 15, wherein $\mu$ is selected so that $\alpha\mu$ is in the range of 0.0001 to 0.2 and $\alpha\mu$ controls a tap leakage process.

19. The method of claim 12, further comprising limiting the absolute value of each tap coefficient.

20. The method of claim 12, further comprising fixing at least one tap coefficient.

21. The method of claim 12, wherein the first sampling rate is greater than the second sampling rate.

22. The method of claim 21, wherein the second sampling rate is a symbol-sampling rate.

23. A computer readable medium tangibly embodying a program of machine-readable instructions executable by a digital processing apparatus to perform an operation to adapt tap coefficients, the operation comprising:

summing products of a plurality of tap signals from a delay line sampling a read signal and a plurality of corresponding tap coefficients to form an equalized signal in an asynchronous time domain having a first sampling rate;

calculating a leaky function for each tap coefficient in the asynchronous time domain, wherein the leaky function of each tap coefficient is an operation $c_{i,n}-\alpha\mu f(c_{i,n})$ where $\mu$ is a constant parameter, and $f(c_{i,n})$ is a coefficient function operation of each tap coefficient $c_{i,n}$; and adapting each of the tap coefficients as the leaky function for each tap coefficient summed with a signal-dependent updating function for each tap coefficient calculated in a synchronous time domain having a second sampling rate and interpolated into the asynchronous time domain, wherein the signal-dependent updating function comprises an operation to calculate an error signal for each tap signal as the difference between the equalized signal interpolated into the synchronous time domain and an estimated signal.

24. The signal bearing medium of claim 23, further comprising an operation to calculate the estimated signal from the equalized signal interpolated into the synchronous time domain and has a target signal type selected from a partial response class-4 ("PR4") polynomial, an extended PR4 ("EPR4") polynomial, an extended EPR4 ("EEPR4") polynomial, a generalized partial-response ("GPR") polynomial with noninteger coefficients, and a GPR polynomial for noise-predictive maximum-likelihood ("NPML") detection.

25. The computer readable medium of claim 23, wherein the signal-dependent updating function is an operation $(-\alpha e_n x_{n-i})$ where $\alpha$ is a constant parameter, $e_n$ is the error signal for the tap signal, and $x_{n-i}$ is the tap signal.

26. The computer readable medium of claim 23, wherein the coefficient function $f(c_{i,n})$ is equal to $c_{i,n}$.

27. The computer readable medium of claim 23, wherein the coefficient function $f(c_{i,n})$ is equal to the sign of $c_{i,n}$.

28. The computer readable medium of claim 23, wherein $\mu$ is selected so that $\alpha\mu$ is in the range of 0.0001 to 0.2 and $\alpha\mu$ controls a tap leakage process.

29. The computer readable medium of claim 23, further comprising an operation to fix at least one tap coefficient.

30. An apparatus to adapt tap coefficients, the apparatus comprising:

means for summing products of a plurality of tap signals from a delay line sampling a read signal and a plurality of corresponding tap coefficients to form an equalized signal in an asynchronous time domain having a first sampling rate;

means for calculating a leaky function for each tap coefficient in the asynchronous time domain, wherein the leaky function of each tap coefficient is calculated as $c_{i,n}-\alpha\mu f(c_{i,n})$ where $\mu$ is a constant parameter, and $f(c_{i,n})$ is a coefficient function operation of each tap coefficient $c_{i,n}$; and means for adapting each of the tap coefficients as the leaky function for each tap coefficient summed with a signal-dependent updating function for each tap coefficient calculated in a synchronous time domain having a second sampling rate and interpolated into the asynchronous time domain, wherein the signal-dependent updating function is calculated as $(-\alpha e_n x_{n-i})$ where $\alpha$ is a constant parameter, $e_n$ is the error signal for the tap signal, and $x_{n-i}$ is the tap signal.

* * * * *

UNITED STATES PATENT AND TRADEMARK OFFICE
CERTIFICATE OF CORRECTION

PATENT NO. : 7,596,176 B2  Page 1 of 1
APPLICATION NO. : 11/263189
DATED : September 29, 2009
INVENTOR(S) : Eleftheriou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twenty-eighth Day of September, 2010

David J. Kappos
*Director of the United States Patent and Trademark Office*